United States Patent
Koizumi

(10) Patent No.: US 9,001,243 B2
(45) Date of Patent: Apr. 7, 2015

(54) IMAGING APPARATUS AND PROCESSING METHOD THEREOF

(71) Applicant: Canon Kabushiki Kaisha, Tokyo (JP)

(72) Inventor: Toru Koizumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/221,394

(22) Filed: Mar. 21, 2014

(65) Prior Publication Data

US 2014/0192241 A1    Jul. 10, 2014

Related U.S. Application Data

(62) Division of application No. 13/446,003, filed on Apr. 13, 2012, now Pat. No. 8,717,473, which is a division of application No. 12/147,077, filed on Jun. 26, 2008, now Pat. No. 8,179,459.

(30) Foreign Application Priority Data

Jul. 4, 2007    (JP) .................................. 2007-176510

(51) Int. Cl.
*H04N 3/14* (2006.01)
*H04N 5/335* (2011.01)
*H04N 5/374* (2011.01)
*H04N 5/235* (2006.01)
*H04N 5/355* (2011.01)
*H04N 5/3745* (2011.01)

(52) U.S. Cl.
CPC ........... *H04N 5/3742* (2013.01); *H04N 5/2355* (2013.01); *H04N 5/35572* (2013.01); *H04N 5/374* (2013.01); *H04N 5/37457* (2013.01)

(58) Field of Classification Search
USPC ......... 348/294–324; 250/208.1; 257/290–292
See application file for complete search history.

(56) References Cited

U.S. PATENT DOCUMENTS

| | | | |
|---|---|---|---|
| 6,847,026 B2 | 1/2005 | Koizumi et al. | |
| 6,930,722 B1 | 8/2005 | Nakamura et al. | |
| 6,963,371 B2 | 11/2005 | Sakurai et al. | |
| 6,987,685 B2 | 1/2006 | Koizumi et al. | |
| 7,324,144 B1 | 1/2008 | Koizumi | |
| 7,355,645 B2 | 4/2008 | Sakurai et al. | |
| 2005/0195307 A1 | 9/2005 | Sakurai et al. | |
| 2006/0208291 A1* | 9/2006 | Koizumi et al. | 257/292 |
| 2006/0221667 A1* | 10/2006 | Ogura et al. | 365/149 |
| 2007/0096238 A1 | 5/2007 | Oike et al. | |
| 2008/0012976 A1 | 1/2008 | Sakurai et al. | |

FOREIGN PATENT DOCUMENTS

| | | |
|---|---|---|
| EP | 1 746 820 A1 | 1/2007 |
| JP | 2005-328493 A | 11/2005 |
| JP | 2006-261594 A | 9/2006 |
| JP | 2006-262387 A | 9/2006 |
| JP | 2007-151069 A | 6/2007 |

* cited by examiner

*Primary Examiner* — Yogesh Aggarwal
(74) *Attorney, Agent, or Firm* — Fitzpatrick, Cella, Harper & Scinto

(57) ABSTRACT

A solid-state imaging apparatus of a dynamic range enlarged by reading out a carrier accumulated in a carrier accumulation unit at a plurality of times during a single carrier accumulation time period.

8 Claims, 8 Drawing Sheets

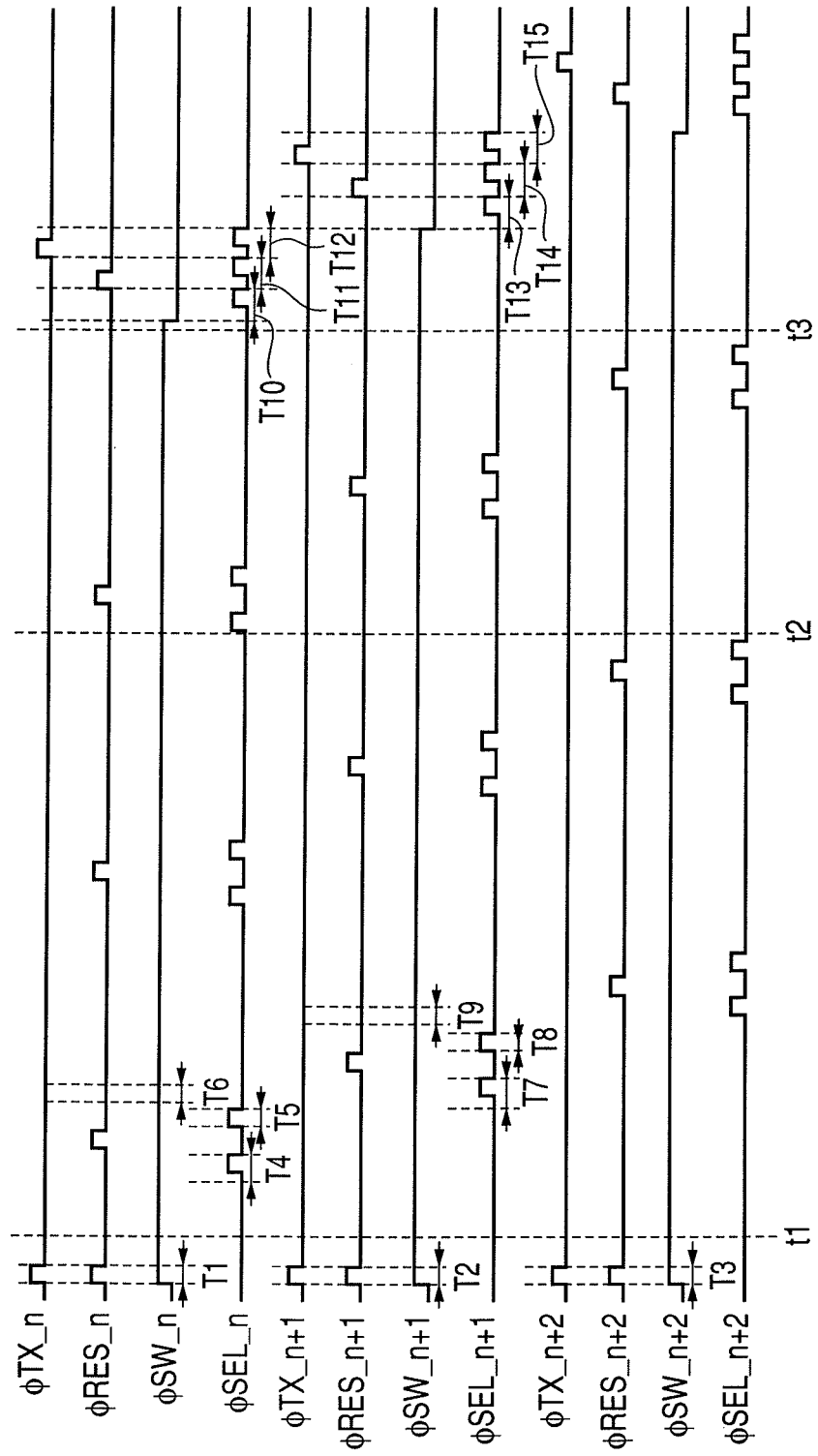

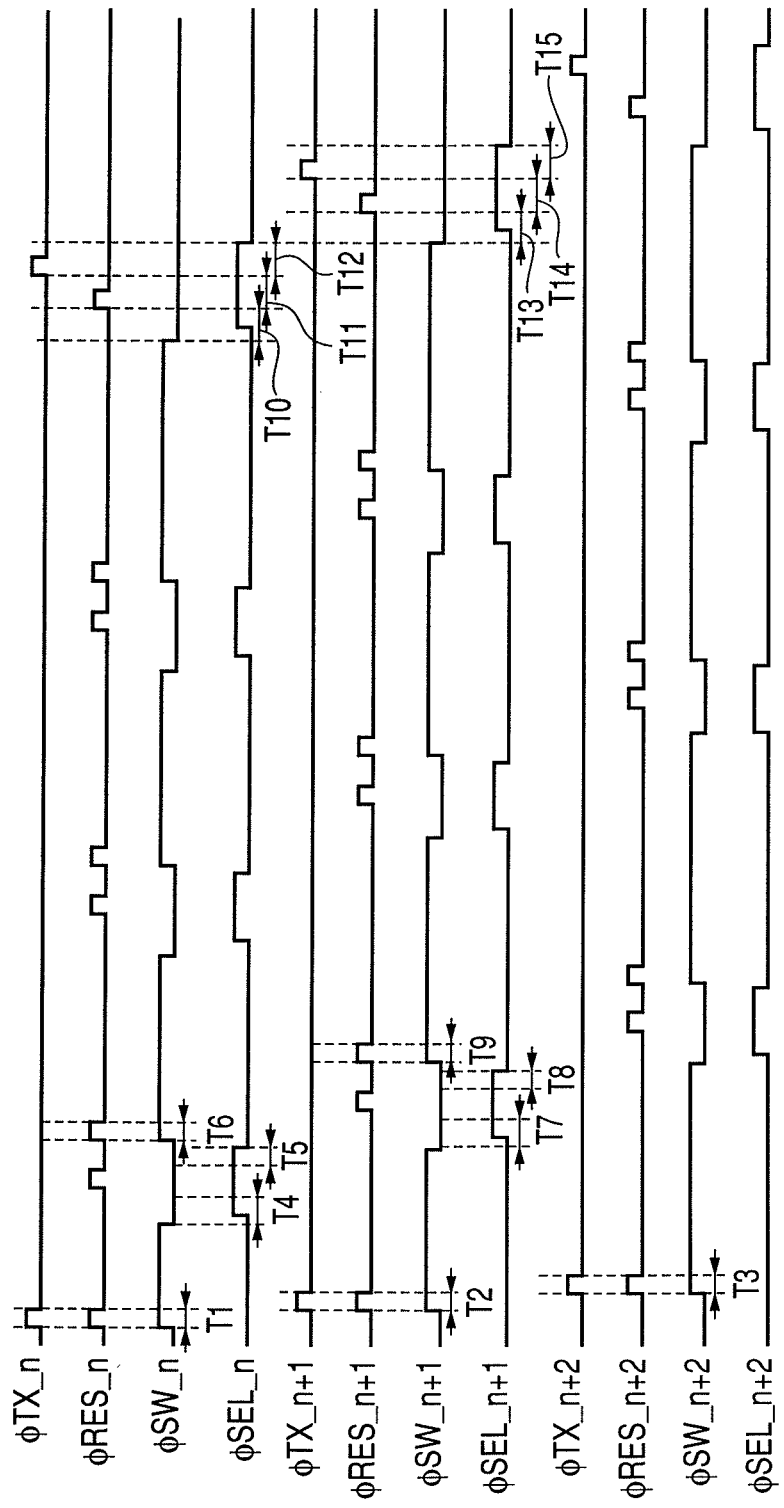

IMAGING APPARATUS AND PROCESSING METHOD THEREOF

This application is a division of application Ser. No. 13/446,003 filed Apr. 13, 2012, which is a division of application Ser. No. 12/147,077 filed Jun. 26, 2008, U.S. Pat. No. 8,179,459 B2.

BACKGROUND OF THE INVENTION

1. Field of the Invention

The present invention relates to an imaging apparatus and the processing method thereof.

2. Description of the Related Arts

The following three kinds of driving methods for enlarging a dynamic range of a solid-state imaging apparatus is disclosed in Japanese Patent Application Laid-Open No. 2005-328493. The first kind is such that a carrier overflowed from a photo receiving unit is accumulated in floating diffusion and an added capacitor so as to be turned into a dynamic range expansion signal. The second kind is such that, during a part of the period only within the accumulation period of the photo receiving unit, the overflowed carrier is accumulated so as to be turned into a dynamic range expansion signal. The third kind is such that the signal accumulated in the photo receiving unit as well as the dynamic range expansion signal are added inside a pixel so as to be output.

Japanese Patent Application Laid-Open No. 2005-328493 discloses that the floating diffusion contains a dark impurity region and a PN junction composed of a p-type well, and that a photo diode is an embedded photo diode. However, there is a problem that the floating diffusion is great in dark output due to the generation current in a depletion layer for the photo diode.

Although there is no cause for concern when the accumulation period is short, when the accumulation period is long, a problem occurs that many signals are generated due to dark currents of a floating diffusion region that accumulates the dynamic range expansion signals as well as the added capacitor. This is because the FD and CS units are not the PN junction capacitor of the berried type, and as a result, the dark current is increased, and therefore, they are not suitable as holding units for holding the carrier for a long time. The signal amplitude at the FD (or a vertical signal line) is put on restrictions by a dark current component, and no signal amplitude for the dynamic range expansion signal can be secured.

This problem can be improved to a certain degree by the second kind of the driving method by making the accumulation period of the dynamic range expansion signal short. However, this time, the accumulation period of the photo diode and the accumulation period of the dynamic range expansion signal are deviated from each other, and therefore, there arises a major problem that the synchronicity of the two signals are harmed. Whichever case it may be, in the case of moving image, since the accumulation period is short, no problem is caused, whereas in the case of the still image photographing such as a digital single-lens reflex camera, it is a major problem.

An object of the present invention is to provide an imaging apparatus and its processing method capable of enlarging a dynamic range, while securing synchronicity of the carrier accumulation period of a photoelectric conversion unit and a carrier accumulation unit.

SUMMARY OF THE INVENTION

An imaging apparatus of the present invention includes: a photoelectric conversion unit for generating a carrier by a photoelectric conversion and for accumulating the carrier generated; a carrier accumulation unit for accumulating the carrier overflowed from the photoelectric conversion unit; a read out unit for reading out, at plural times, a signal based on the carrier accumulated in the carrier accumulation unit during a single carrier accumulation period for the carrier generated by the photoelectric conversion unit; and a reset switch for resetting the carrier accumulated in the carrier accumulation unit after each reading by the read out unit.

The processing method of the imaging apparatus of the present invention is a processing method of the imaging apparatus including: a photoelectric conversion unit for generating a carrier by photoelectric conversion and for accumulating the carrier generated, and a carrier accumulation unit for accumulating the carrier overflowed from the photoelectric conversion unit, wherein the method includes steps of: reading out, at plural times, a signal based on the carrier accumulated in the carrier accumulation unit in a single carrier accumulation period for the carrier generated by the photoelectric conversion unit and a resetting the carrier accumulated in the carrier accumulation unit after each reading.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a timing chart showing a drive timing of the solid-state imaging apparatus according to a fifth embodiment of the present invention.

FIG. 10 is a timing chart showing a drive timing of the solid-state imaging apparatus.

The accompanying drawings, which are incorporated in and constitute a part of the specification, illustrate embodiments of the invention and, together with the description, serve to explain the principles of the invention.

DESCRIPTION OF THE EMBODIMENTS (First Embodiment)

By using FIGS. 1 to 4, a first embodiment of the present invention will be described.

Figure 1:
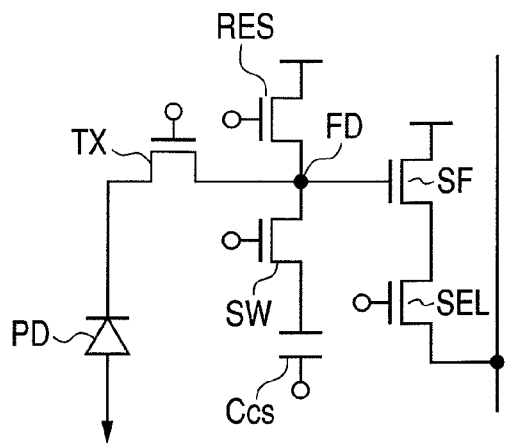
FIG. 1 is a circuit diagram showing a configuration example of a pixel unit inside a photo receiving unit according to a first embodiment of the present invention.
Figure 2:
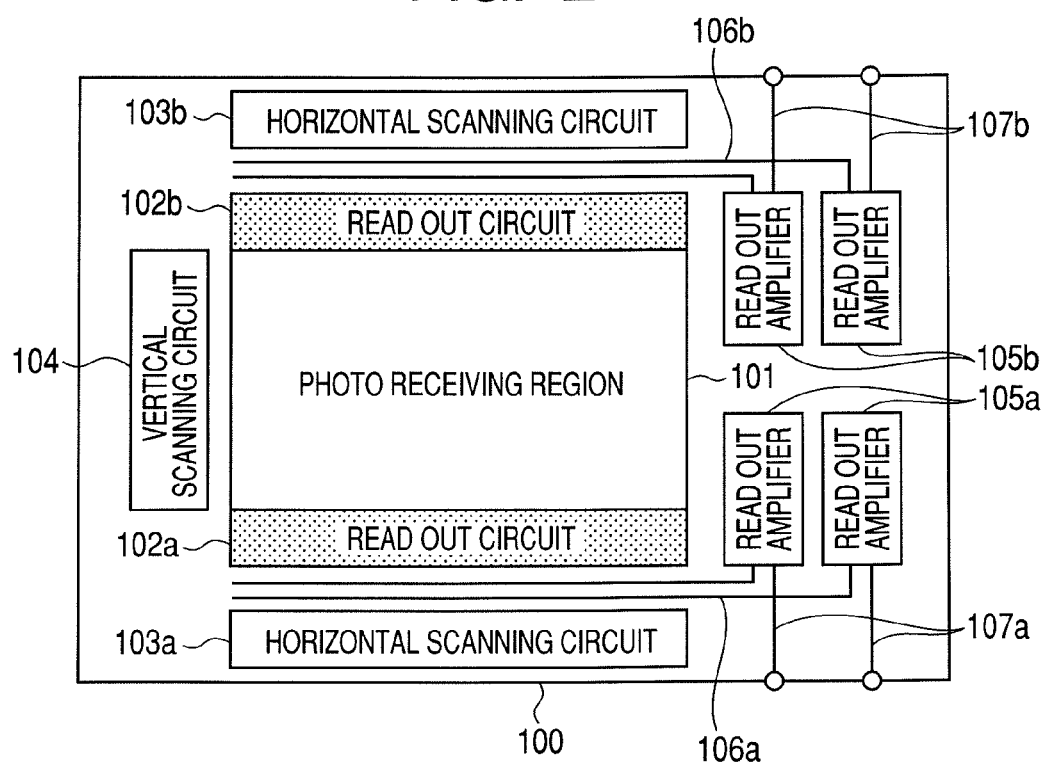
FIG. 2 is a block diagram showing a configuration example of a solid-state imaging apparatus according the first embodiment of the present invention.

FIG. 2 is a block diagram showing a configuration example of a MOS type solid-state imaging apparatus according to the first embodiment of the present invention, and FIG. 1 is a circuit diagram showing a configuration example of a pixel unit inside a photo receiving region 101 of FIG. 2. This pixel unit is two-dimensionally plurally disposed inside the photo receiving region 101.

In FIG. 1, reference symbol PD denotes a photo diode. The photo diode PD converts a received light into a carrier and accumulates it. Reference symbol TX denotes a transfer switch. Reference symbol RES denotes a reset switch for resetting a floating diffusion region FD. Reference symbol SF denotes an input MOS electric field effect transistor of a source follower taking the floating diffusion region FD as an input terminal. Reference symbol SEL denotes a row selection switch. Reference FD denotes a source follower input terminal, and denotes a floating diffusion region, which holds a transferred carrier, and converts it into voltage. Reference symbol SW denotes a switch for controlling the connection of a holding capacitor Ccs and the floating diffusion region FD. Reference symbol Ccs is a holding capacitor for accumulating the carrier overflowed from the photo diode PD. In addition to the photo diode PD, by providing the holding capacitor Ccs, the carrier accumulation capacitance can be increased, and the dynamic range can be expanded. The driving method of this pixel unit will be described later with reference to FIG. 3.

In FIG. 2, reference numeral 100 denotes a sensor chip. Numeral 101 denotes a light receiving region. Numerals 102a and 102b denote column signal processing circuits. Numerals 103a and 103b denote horizontal scanning circuits. Numeral 104 denotes a vertical scanning circuit. Numerals 105a and 105b denote a read out amplifier. Numerals 106a and 106b denote a common signal line unit. Numerals 107a and 107b denote output line unit.

The photo receiving region 101 has a plurality of pixel units of FIG. 1, and generates two-dimensional pixel signals. The vertical scanning circuit 104 sequentially selects the row of the pixel unit of the photo receiving region 101, and the signal of the pixel unit of the selected row is read out to the column signal processing circuits 102a and 102b. The horizontal scanning circuits 103a and 103b sequentially select the columns of the signals of the column signal processing circuits 102a and 102b, and allow the selected signals to be output to the read out amplifiers 105a and 105b through the common signal line units 106a and 106b. The read out amplifiers 105a and 105b amplify the signals, and output them to the outside through the output line units 107a and 107b.

Figure 3:
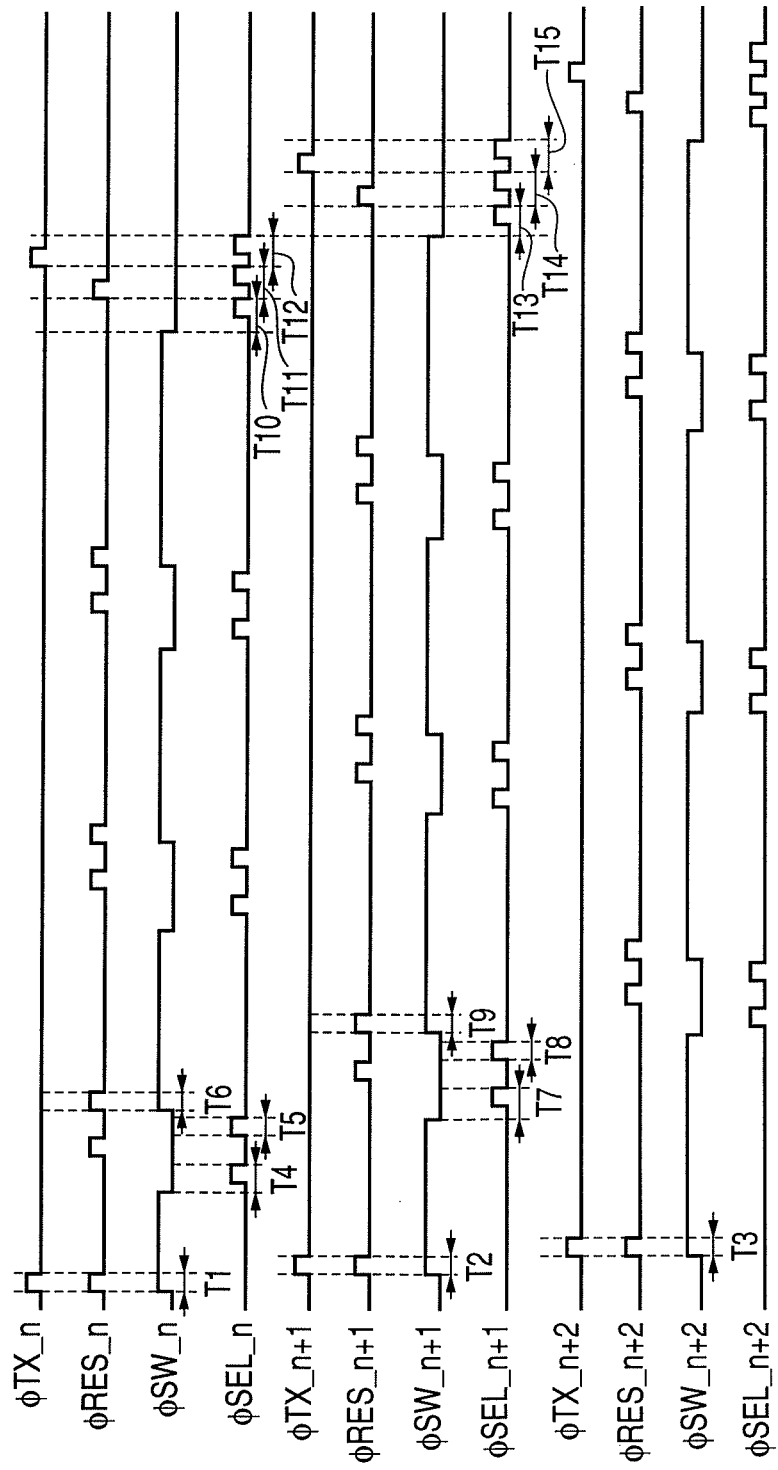
FIG. 3 is a timing chart showing a drive timing in a pixel unit of a (n+2)th row from a n-th row of a photo receiving region.

FIG. 3 is a timing chart showing a drive timing in the pixel unit of an (n+2)th from an n-th row of the photo receiving region 101. Hereinafter, a processing method of the solid-state imaging apparatus will be described. Each pulse is a signal generated by the vertical scanning circuit 104, and is as follows. ΦRES denotes the gate drive pulse of a reset transistor RES of FIG. 1. ΦTX denotes the gate drive pulse of a transfer transistor TX of FIG. 1. ΦSW denotes the gate drive pulse of a switch transistor SW of FIG. 1. ΦSEL denotes the gate drive pulse of a transistor SEL of FIG. 1. The (n to n+2) at the end of each pulse denotes a row. Further, the vertical scanning circuit 104 outputs a high level to the gate of the switch SEL so as to enable the switch SEL to turn on, and outputs a low level to the gate of the switch SEL so as to enable the switch SEL to turn off.

A transfer switch TX, when the signal ΦTX becomes a high level, transfers the signal accumulated in the photo diode PD to the floating diffusion region FD which is an input terminal of the source flower transistor SF. The reset switch RES, when the signal ΦRES becomes a high level, resets the floating diffusion region FD. The holding capacitor Ccs is a capacitor for holding the carrier overflowed from the photo diode PD. The switch SW is a switch for controlling the connection with the floating diffusion region FD and the holding capacitor Ccs. The switch SEL is a switch for selecting the row of the pixel unit of the photo receiving region 101, and reads out the output signal of the source flower transistor SF to the column signal processing circuit 103a or 103b when the gate becomes a high level.

As shown in FIG. 3, the dynamic range expansion signal of the photo diode PD is read out by dividing it in four times. The operations of the periods T1 to T15 will be described below.

The period T1 is a period in which the reset operation of the photo diode PD of the n-th row is performed. The period T1 is a period in which the high level state of the pulse is maintained, and specifically, it is a period in which the signals ΦTX_n, ΦRES_n, and ΦSW_n maintain the high level, and the other signals in the figure maintain the low level. The transistors TX, RES, and SW of the n-th row are turned on, and the photo diode PD and the holding capacitor Ccs of the n-th row are reset.

The period T2 is a reset period of the photo diode PD of the (n+1)th row. Specifically, it is a period in which the signals ΦTX_n+1, ΦRES_n+1, and ΦSW_n+1 maintain the high level, and the other signals in the figure maintain the low level. The transistors TX, RES, and SW of the (n+1)th row are turned on, and the photo diode PD and the holding capacitor Ccs of the (n+1)th row are reset.

The period T3 is a reset period of the photo diode PD of the (n+2)th row. Specifically, it is a period in which the signals ΦTX_n+2, ΦRES_n+2, and ΦSW_n+2 maintain the high level, and the other signals in the figure maintain the low level. The transistors TX, RES, and SW of the (n+2)th row are turned on, and the photo diode PD and the holding capacitor Ccs of the (n+2)th row are reset.

The period T4 is a first read out period of the dynamic range expansion signal of the n-th row. The signal ΦSW_n becomes the low level from the high level. The transistor SW of the n-th row is turned off from turning on. The holding capacitor Ccs accumulates the carrier overflowed from the photo diode PD, and as long as the transistor SW is turned on, its carrier is output to the floating diffusion region FD through the transistor SW. By making the signal ΦSEL_n a high level from a low level, the source follower transistor SF reads out the signal based on the potential of the floating diffusion region FD as the dynamic range expansion signal. The column signal processing circuit 102a or 102b reads out the dynamic range expansion signal and holds it.

Next, the signal ΦRES_n becomes a high level, and the transistor RES of the n-th row is turned on. As a result, the floating diffusion region FD of the n-th row is reset.

The period T5 is a first read out period of the reset signal of the n-th row. The signal ΦRES_n becomes a low level, and the transistor RES of the nth-row is turned off. By making the signal ΦSEL_n a high level from a low level, the source follower transistor SF reads out the signal based on the potential of the floating diffusion region FD as a reset signal (noise signal). The column signal processing circuit 102a or 102b reads out the reset signal and holds it. The read out amplifier 105a or 105b subtracts the reset signal from the dynamic range expansion signal, so that the pixel signal reduced in noise is output.

The period T6 is a first reset period of the dynamic expansion signal of the n-th row. The signals ΦRES_n and ΦSW_n become a high level and the transistors RES and SW of the n-th row are turned on. As a result, the holding capacitor Ccs of the n-th row is reset.

The period T7 is a first read out period of the dynamic range expansion signal of the (n+1)th row. The signal ΦSW_n+1 becomes a low level from a high level. The transistor SW of the (n+1)th row is turned off from turning on. The holding capacitor Ccs accumulates the carrier overflowed from the photo diode PD, and as long as the transistor SW is turned on, outputs its carrier to the floating diffusion region FD through the transistor SW. By making the signal ΦSEL_n a high level from a low level, the source follower transistor SF reads out the signal based on the potential of the floating diffusion region FD as a dynamic range expansion signal. The column signal processing circuit 102a or 102b reads out the dynamic range expansion signal and holds it.

Next, the signal ΦRES_n+1 becomes a high level, and the transistor RES of the (n+1)th row is turned on. As a result, the floating diffusion region FD of the (n+1)th row is reset.

The period T8 is a first read out period of the dynamic expansion signal of the (n+1)th row. The signal ΦRES_n+1 becomes a low level, and the transistor RES of the (n+1)th row is turned off. By making the signal ΦSEL_n a high level from a low level, the source follower transistor SF reads out the signal based on the potential of the floating diffusion region FD as a reset signal (noise signal). The column signal processing circuit 102a or 102b reads out the reset signal and holds it. The read out amplifier 105a or 105b subtracts the reset signal from the dynamic range expansion signal, so that the pixel signal reduced in noise is output.

The period T9 is a first reset period of the dynamic range expansion signal of the (n+1)th row. The signals ΦRES_n+1 and ΦSW_n+1 become a high level, and the transistors RES and SW of the (n+1)th row are turned on. As a result, the holding capacitor Ccs of the (n+1)th row is reset.

Even in the (n+2)th row, the processings of the first read out period of the dynamic range expansion signal of the (n+2)th row, the first read out period of the reset signal of the (n+2)th row, and the first rest period of the dynamic range expansion signal of the (n+2)th row are performed. These processings are the same as the processings of the periods T4, T5, and T6 of the n-th row described above.

Next, similarly to the periods T4, T5, and T6, the processings of a second read out period of the dynamic range expansion signal of the n-th row, a second read out period of the reset signal of the n-th row, and a second reset period of the dynamic range expansion signal of the n-th row are performed. Further, after that, similarly, the processings of a third read out period of the dynamic range expansion signal of the n-th row, a third read out period of the reset signal of the n-th row, and a third reset period of the dynamic range expansion signal of the n-th row are performed.

Further, similarly to the periods T7, T8, and T9, the processings of the second read out period of the dynamic range expansion signal of the (n+1)th row, the second read out period of the reset signal of the (n+1)th row, and the second reset period of the dynamic range expansion signal of the (n+1)th row are performed. Further, after that, similarly, the processings of the third read out period of the dynamic range expansion signal of the (n+1)th row, the third read out period of the reset signal of the (n+1)th row, and the third reset period of the dynamic range expansion signal of the (n+1)th row are performed.

Further, similarly to the periods T4, T5, and T6, the processings of the second read out period of the dynamic range expansion signal of the (n+2)th row, the second read out period of the reset signal of the (n+2)th row, and the second reset period of the dynamic range expansion signal of the (n+2)th row are performed. Further, after that, similarly, the processings of the third read out period of the dynamic range expansion signal of the (n+2)th row, the third read out period of the reset signal of the (n+2)th row, and the third reset period of the dynamic range expansion signal of the (n+2)th row are performed.

The period T10, similarly to the period T4, is a fourth read out period of the dynamic range expansion signal of the n-th row.

The period T11, similarly to the period T5, is a reset period of a fourth read out of the reset signal and the floating diffusion region FD of the n-th row. The signal ΦRES_n becomes a high level, and the transistor RES of the n-th row is turned on. As a result, the floating diffusion region FD is reset. Next, the signal ΦRES_n becomes a low level, and the transistor RES of the n-th row is turned off. By making the signal ΦSEL_n a high level from a low level, the source follower transistor SF reads out the signal based on the potential of the floating diffusion region FD as a reset signal (noise signal). The column signal processing circuit 102a or 102b reads out the reset signal and holds it. The read out amplifier 105a or 105b subtracts the reset signal from the dynamic range expansion signal, so that the pixel signal reduced in noise is output.

The period T12 is a first read out period of the photo diode signal of the n-th row. The signal ΦTX_n becomes a high level, and the transfer transistor TX of the n-th row is turned on. The carrier accumulated in the photo diode PD is output to the floating diffusion region FD. By making the signal ΦSEL_n a high level from a low level, the source follower transistor SF reads out the signal based on the potential of the floating diffusion region FD as a photo diode signal. The column signal processing circuit 102a or 102b reads out the photo diode signal and holds it.

The period T13, similarly to the period T7, is a fourth read out period of the dynamic range expansion signal of the (n+1)th row.

The period T14 is a period for a fourth read out of the reset signal and a reset of the floating diffusion FD of the (n+1)th row. The signal ΦRES_n+1 becomes a high level, and the transistor RES of the (n+1)th row is turned on. As a result, the floating diffusion region FD is reset. Next, the signal ΦRES_n+1 becomes a low level, and the transistor RES of the (n+1)th row is turned off. By making the signal ΦRES_n a high level from a low level, the source follower transistor SF reads out the signal based on the potential of the floating diffusion region FD as a reset signal (noise signal). The column signal processing circuit 102a or 102b reads out the reset signal and holds it. The read out amplifier 105a or 105b subtracts the reset signal from the dynamic range expansion signal, so that the pixel signal reduced in noise is output.

The period T15 is a first read out period of the photo diode signal of the (n+1)th row. The signal ΦTX_n+1 becomes a high level, and the transfer transistor TX of the (n+1)th row is turned on. The carrier accumulated in the photo diode PD is output to the floating diffusion region FD. By making the signal ΦSEL_n a high level from a low level, the source follower transistor SF reads out the signal based on the potential of the floating diffusion region FD as a photo diode signal. The column signal processing circuit 102a or 102b reads out the photo diode signal and holds it.

Next, the processings of the fourth read out period of the dynamic range expansion signal of the (n+2)th row, the fourth read out of the reset signal of the (n+2)th row and the reset period of the floating diffusion FD, and the first readout period of the photo diode signal of the (n+2)th row are performed. These processings are the same as those of the periods T10, T11, and T12.

The driving condition of the solid-state imaging apparatus of the present embodiment has used an apparatus whose read out time of all the pixels takes approximately 30 milliseconds. As against one second of the accumulation time of the photo diode PD, the dynamic range expansion signal reads out the pixel approximately every 250 seconds by dividing it in four times. That is, in the accumulation time longer than the reading time of one frame, the read out operation is performed by dividing the signal overflowed in the same accumulation period in plural times, and the reset operation of the signal overflowed after each read out operation is performed.

The read out operation in the present embodiment is an operation of reading out the signal based on the carrier, which is generated in the photo diode by conducting the SEL switch, to the column signal processing circuit. Further, the subtracting process of the reset signal can be performed in a clamp circuit and the like in which the column signal processing circuits 102a and 102b are provided.

By so doing, by the dark current generated on the floating diffusion region FD and the holding capacitor Ccs, the dynamic range expansion signal can be prevented from being suppressed. Specifically, voltage amplitude at the floating diffusion region FD and the holding capacitor Ccs was 0.5 V at the maximum, whereas the signal by the dark current was generated approximately 100 mV. However, by reading out this signal by dividing it in four times, the voltage was suppressed to 25 mV per one reading time. This signal readout in four divided times is added every pixel by a processing circuit 803 different from the solid-state imaging apparatus, so that the dynamic range is also expanded by that much. Needless to say, a processing circuit may be provided inside the solid-state imaging apparatus, so that the addition is performed inside the solid-state imaging apparatus.

That is, in the method of Japanese Patent Application Laid-Open No. 2005-328493, an enlarged amount of the dynamic range was +400 mV, which is the voltage on the floating diffusion region FD as against a saturation voltage of the photo diode PD. In contrast to this, in the present embodiment, it was possible to obtain an enlarged amount of (500−25)×4=1900 mV, which is as much as approximately five times that of the dynamic range.

The above described value of the dark current is a value of the average pixel. Similarly as the photo diode PD having a white spot (white flaw), the floating diffusion region FD and the holding capacitor Ccs have also the flaws, and depending on the pixels, there are some that have the dark current as much as 100 times that of the average pixel. In such a pixel, the dynamic range expansion signal of +400 mV is not obtained, and in some cases, it is hardly not held. In the present embodiment, there is an effect of not only expanding the dynamic range of the average pixel, but also reducing or eliminating the pixel that is unable to hold the dynamic range expansion signal as described above.

The important thing is that the dark current is also reset in order to perform the reset operation after reading out the dynamic range expansion signal. Further, by reading out and processing the dynamic range expansion signal of the approximately same period as the accumulation period of the photo diode PD, the synchronicity of both signals can be secured.

The reason why "the approximately the same period" is referred to here is because information during the read out period is not obtained in a precise sense. That is, as against several hundreds milliseconds to several tens seconds of the overall accumulation period, the read out time is approximately ten μ seconds, and it is 10 μsecond×the number of read out times and approximately 1/10000 when the information is missing. Each dynamic range expansion signal may be simply added or the gain may be multiplied and added. Further, the gain may be weighted and added or may be added after partially adding the compensation processing. In whichever method employed, it is important that the signal information in the same accumulation period is included. The synchronicity is extremely important item when the image of a long time-second still image such as a firework in particular is handled.

Instead of FIG. 3, the driving of FIG. 10 may be performed. FIG. 10 is different from FIG. 3 in that the pulses of the signals ΦSEL_n, ΦSEL_n+1, and ΦSEL_n+2 are not changed at the selection time.

Figure 4:
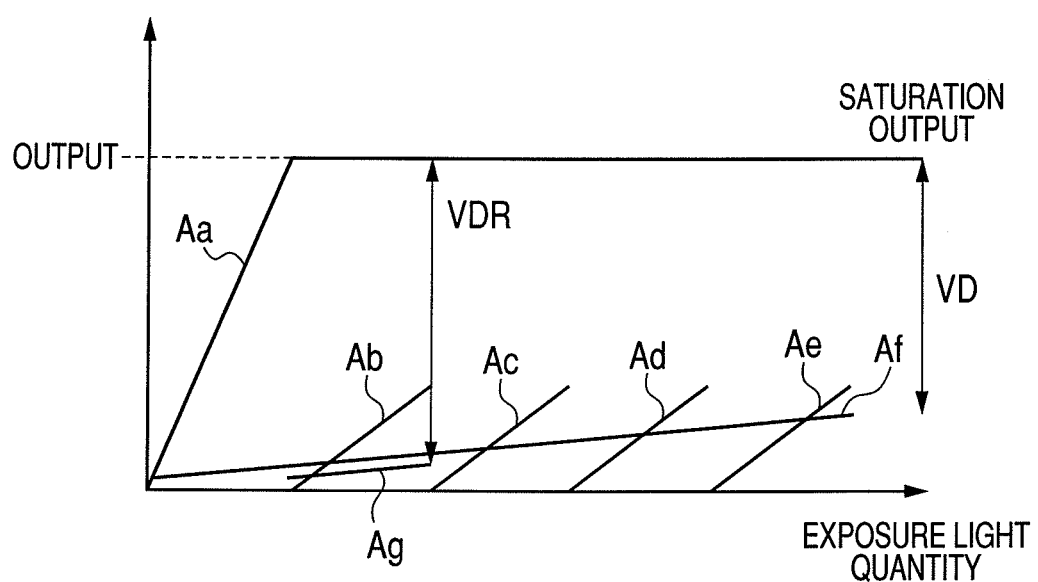
FIG. 4 is a view showing photoelectric conversion characteristics of the first embodiment.

FIG. 4 is a view showing the photoelectric conversion characteristics of the present embodiment, and shows an output signal from a sensor chip 100. A characteristic Aa is a signal of the photo diode PD. Characteristics Ab, Ac, Ad, and Ae are the read out signals from the first to the fourth dynamic range expansion signals. At this time, the reason why the inclination of the characteristic Aa and the inclination of the characteristic Ab are different is because the dynamic range expansion signal is converted into voltage by the capacitance of sum of the capacitance of the floating diffusion region FD and the holding capacitor Ccs. Further, a characteristic Af is an output voltage on the floating diffusion region FD and the holding capacitor Ccs by the dark current on the floating diffusion region FD and the holding capacitor Ccs in Japanese Patent Application Laid-Open No. 2005-328493. A characteristic Ag is an output voltage on the floating diffusion region FD and the holding capacitor Ccs by the dark current on the floating diffusion region FD and the holding capacitor Ccs in the present embodiment.

In Japanese Patent Application Laid-Open No. 2005-328493, the dynamic range expansion amount is VD. In the present embodiment, when a VDR is used, the dynamic range expansion amount is expressed in the following formula.

$$[\text{the number of read out times}] \times VDR \times \{[\text{capacitance of } FD] + [\text{capacitance of } Ccs]\}/[\text{capacitance of } FD]$$

Consequently, according to the number of read out times, the dynamic range expansion amount can be increased.

(Second Embodiment)

Figure 5:
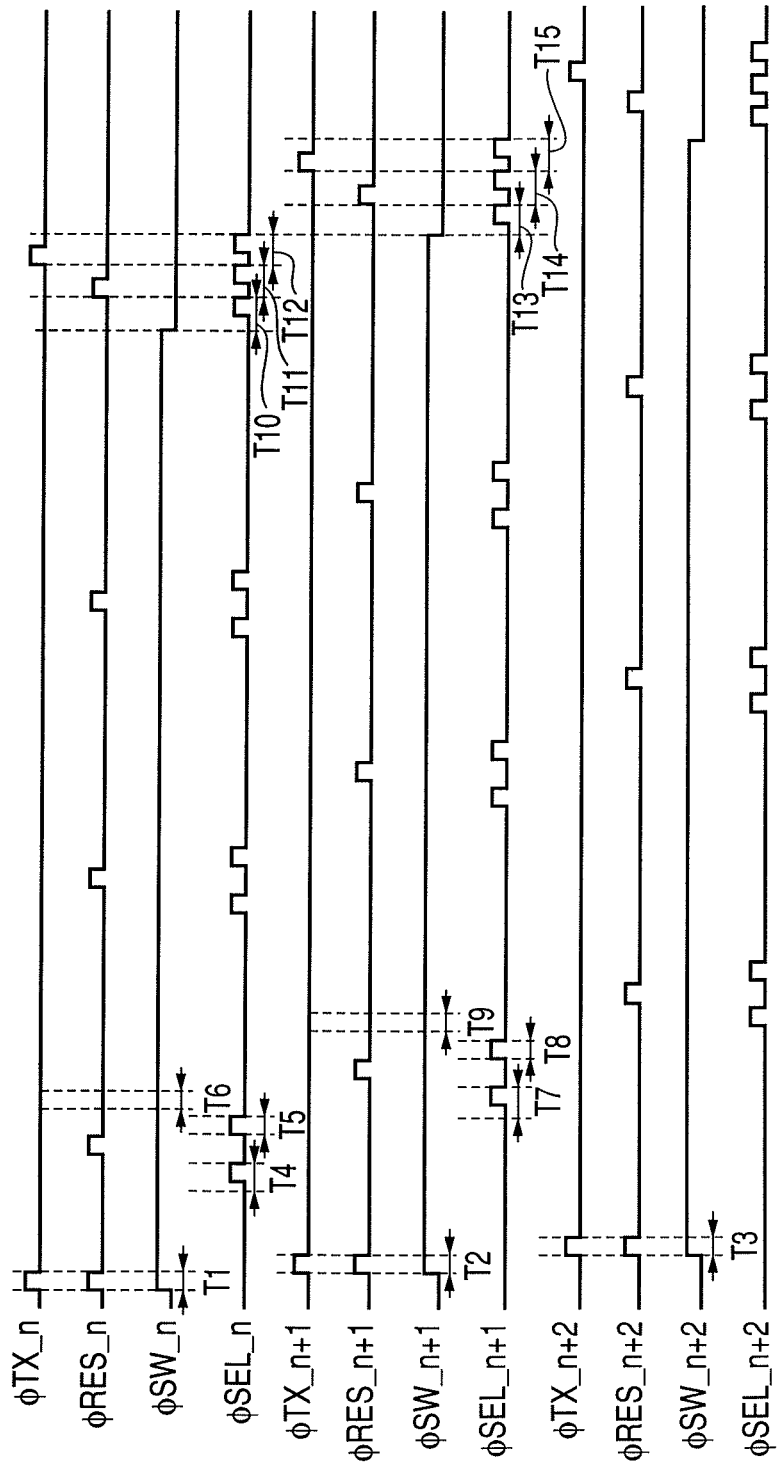
FIG. 5 is a timing chart showing a drive timing of the solid-state imaging apparatus according to a second embodiment of the present invention.

FIG. 5 is a timing chart showing a drive timing of a solid-state imaging apparatus according to a second embodiment of the present invention. The present embodiment is driven by the timing shown in FIG. 5 in the same circuit as the first embodiment. FIG. 5 is the drive timing chart in pixel units from the n-th row to the (n+2)th row of the present embodiment. The present embodiment (FIG. 5) is different from the first embodiment (FIG. 3) in that a signal ΦSW is fixed at a high level during the carrier accumulation period of a photo diode PD. By operating in such a manner, the operations of the period T6 and the like which were the first embodiment are not required. That is, at the period T6 and the like, the signal ΦRES is not required to be made high level. Similarly to the first embodiment, the signals ΦSEL_n, ΦSEL_n+1, and ΦSEL_n+2 of FIG. 10 may be applied.

(Third Embodiment)

A third embodiment of the present invention will be described with reference to FIGS. 6 and 7.

Figure 6:
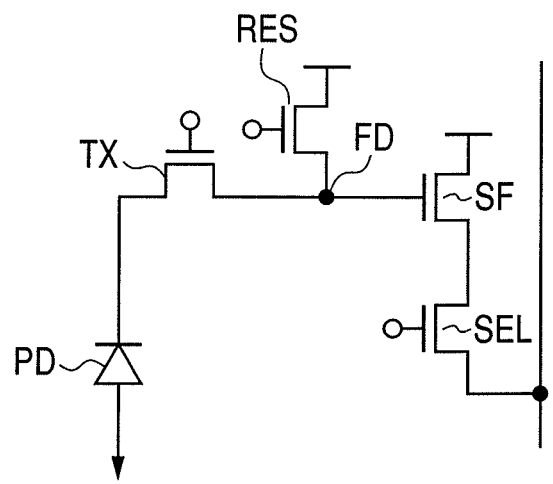
FIG. 6 is a circuit diagram showing a configuration example of the pixel unit inside the photo receiving region according to the second embodiment.

FIG. 6 is a circuit diagram showing a configuration example of a pixel unit inside a photo receiving region 101 of FIG. 2. The present embodiment (FIG. 6) is different from the first embodiment (FIG. 1) in that there is neither holding capacitor Ccs nor transistor SW. The drive timing of the present embodiment is the same as the one excluding the signal ΦSW from among the drive timings of FIG. 5. Even when there is no holding capacitor Ccs, the effect of the present embodiment is the same as that of the first embodiment. In a carrier accumulation period of a photo diode PD, a transfer switch TX is turned off, and when a carrier is overflowed from the accumulation unit of the photo diode PD, the overflowed carrier flows to a floating diffusion region FD through a transfer switch TX.

Figure 7:
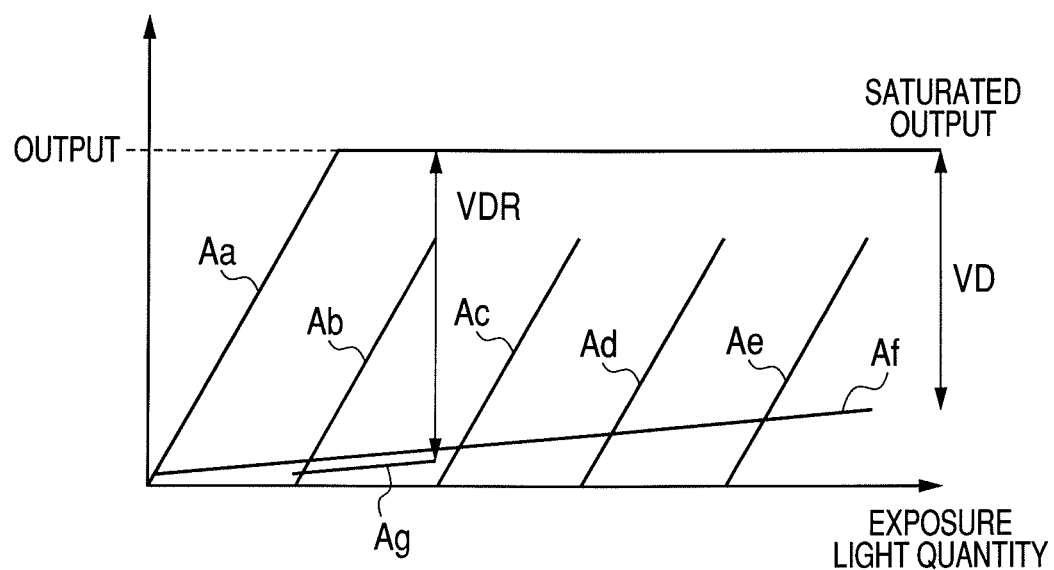
FIG. 7 is a view showing photoelectric conversion characteristics of the second embodiment.

FIG. 7 is a view showing the photoelectric conversion characteristics of the solid-state imaging apparatus. In the photoelectric conversion characteristics, characteristics Aa to Ag indicate the same characteristics of the first embodiment (FIG. 4). The reason why the inclinations of the characteristics Aa and Ab are equal is because both of the signal of the photo diode PD and the dynamic range expansion signal are converted into voltage by the capacitance of the floating diffusion region FD. If such a form is taken, subsequently, when the addition is performed suitably by a processing circuit, the processing becomes simple, and a system load is reduced, and the processing time becomes high speed.

The characteristic of the present embodiment is that the number of pixels within one pixel unit is few, and the embodiment can also cope with the pixel unit which is much smaller in size. Although the expansion amount of the dynamic range is few, the amount can be supplemented by increasing the number of read out times.

Further, the present embodiment is provided with an overflow drain for discharging the carrier overflowed in a route different from the transfer switch TX to the photo diode PD, so that the expansion amount of the dynamic range can be further increased. Even in this case, the same effect can be obtained. The photoelectric conversion characteristic in this case becomes as shown in FIG. 4, and a difference in the inclinations of the characteristics Aa and Ab has the following relationship.

Assuming that a carrier amount overflowed from the photo diode PD=A, a carrier amount discharged by the overflow drain=B, a carrier amount held in the floating diffusion region FD=C, an inclination of the characteristic Aa=α, and an inclination of the characteristic Ab=β, the following relationship is established.

$A=B+C$ $\alpha/\beta=A/C$

By providing the overflow drain, the dynamic range can be further expanded.

Further, as a modification of the present embodiment, a Ccs unit is provided, and this Ccs unit is composed of a PN junction capacitance only and can be considered also to have a configuration not provided with a capacitance by a gate oxide film. The Ccs unit has a PN junction capacitor composed of a semiconductor substrate and a high density impurity region.

(Fourth Embodiment)

Figure 8:
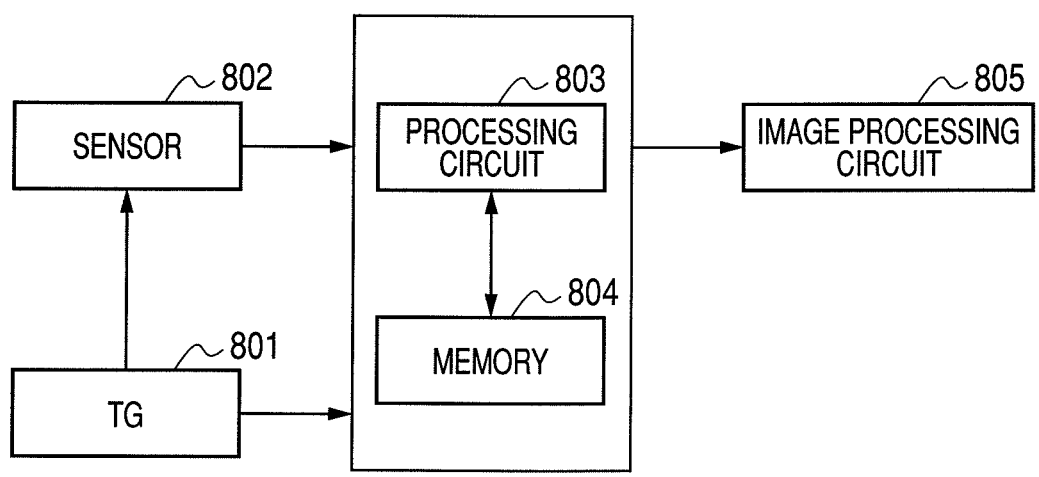
FIG. 8 is a view showing a configuration example of a camera system in a case when the solid-state imaging apparatus according to a fourth embodiment of the present invention is used for a camera.

With reference to FIG. 8, a fourth embodiment of the present invention will be described. FIG. 8 is a view showing a configuration example of a camera system in a case when a solid-state imaging apparatus according to a fourth embodiment of the present invention is used for a camera. A sensor 802 in the figure corresponds to a sensor chip 100 of FIG. 2, and the solid-state imaging apparatus according to the third embodiment was used. Needless to say, it does not matter if the solid-state imaging apparatus according to other embodiments are used. The signals output from a sensor 802, that is, a dynamic range expansion signal and a photo diode signal are held in a memory 804 through a processing circuit 803. The processing circuit 803 uses the memory 804 to add and process the dynamic range expansion signal and the photo diode signal. After the completion of carrier accumulation, the last photo diode signal is read out from the sensor 802 to the processing circuit 803. The processing circuit 803 outputs the added and processed signals to an image processing circuit 805. The image processing circuit 805 performs an image processing. A timing generator 801 generates control signals of the sensor 802, the processing circuit 803, and the memory 804.

In the third embodiment, similarly to FIG. 7, by making the photoelectric conversion characteristic such that the inclination of the photoelectric conversion characteristic Aa before saturation and the inclinations of the photoelectric conversion characteristics Ab to Ae after saturation are equal, the processing circuit 803 has only to perform a simple addition processing, so that the processing circuit 803 can be made simple.

(Fifth Embodiment)

FIG. 9 is a timing chart showing a drive timing of a solid-state imaging apparatus according to a fifth embodiment of the present invention. The present embodiment is an embodiment in a case of using a mechanical shutter together, and uses the same circuit as that of the first embodiment. At the time t1, the mechanical shutter is opened, and at the time t3, the mechanical shutter is closed. The operations of periods T1 to T15 are the same as those of FIG. 5 provided that the operations of the periods T1 to T3 are simultaneously performed.

A start of exposure is regulated by the mechanical shutter open of the time t1, and an end of exposure is regulated by the mechanical shutter close of the time t3. Since the start of exposure is regulated by the mechanical shutter, similarly to the first embodiment, even when reset operations of the periods T1 to T3 are sequentially performed, when the mechanical shutter is opened after the end of resetting all the rows, the same image can be obtained. Further, when the mechanical shutter is closed at the time t2, the last dynamic range expansion signal contains the dark current information only of the floating diffusion region FD. Hence, the front-half three signals are added, and the last signal is subtracted, so that the fixed pattern noise can be also reduced.

The drive timing when using the mechanical shutter together is not the one limited to FIG. 9, and even by the driving timings of FIGS. 3 and 5, if the mechanical shutter is worked together based on the above described idea, a good image can be obtained. Further, similarly to the first embodiment, the signals ΦSEL_n, ΦSEL_n+1, and ΦSEL_n+2 of FIG. 10 may be applied.

As described above, the first to the fifth embodiments are the solid-state imaging apparatus two-dimensionally disposed with the pixel unit composed of at least a photo diode PD and a transfer switch TX for transferring the signal of the photo diode PD, and a holding capacitor Ccs for holding the signal overflowed from the photo diode PD. The apparatus reads out the signal overflowed in the same accumulation period by dividing it in plural times, and performs a reset operation of the overflowed signal after each reading.

Japanese Patent Application Laid-Open No. 2005-328493 discloses one time reading only of the dynamic range expansion signal for the carrier accumulation period of the photo diode. That is, in Japanese Patent Application Laid-Open No. 2005-328493, as against one time reading of the photo diode, the read out of the dynamic range expansion signal is one time only. The present embodiment reads out the dynamic range expansion signal plural times for the carrier accumulation period of the photo diode PD, and secures the synchronicity of the carrier accumulation periods of the photo diode PD and the holding capacitor Ccs, while making it possible to expand the dynamic range.

In the solid-state imaging apparatus of the first to the fifth embodiments, the photo diode PD is a photoelectric conversion unit for generating the carrier by the photoelectric conversion and accumulating the generated carrier. The holding capacitor Ccs or the floating diffusion region FD is a carrier accumulation unit for accumulating a carrier overflowed from the photoelectric conversion unit PD. A row selection switch SEL is a read out unit for reading out the signal based on the carrier generated in the photoelectric conversion unit to the outside. This read out unit may contain a vertical scanning circuit 104 for driving the row selection switch SEL. The column signal processing circuits 102a and 102b read out the signal based on the carrier accumulated in the carrier accumulating unit Ccs or the FD in the carrier accumulation period of one time with respect to the carrier generated by the photoelectric conversion unit PD, and processes this signal. A reset switch RES resets the carrier accumulated in the carrier accumulation unit Ccs or the FD after each reading of the read out units 102a and 102b.

In the first embodiment (FIG. 1), the carrier accumulation unit is the holding capacitor Ccs. The transfer switch TX is a switch for transferring the carrier accumulated in the photoelectric conversion unit PD to the floating diffusion region FD. A switch SW is connection switch for connecting between the carrier accumulation unit Ccs and the floating diffusion region FD. This switch reads out the signal based on the carrier of the floating diffusion region FD through a source follower transistor SF by the control of a row selection switch SEL.

In the third embodiment (FIG. 6), the carrier accumulation unit is a floating diffusion region FD. The switch TX is a transfer switch for transferring the carrier accumulated in the photoelectric conversion unit PD to the floating diffusion region FD. This switch reads out the signal based on the carrier of the floating diffusion region FD by the control of the row selection switch SEL.

The read out units 102a and 102b read out the carrier accumulated in the photoelectric conversion unit PD after reading the carrier accumulated in the carrier accumulation unit Ccs or the FD plural times in the first carrier accumulation period.

The above described embodiments have been described only in the preferred forms, respectively, and are to be considered in all aspects as illustrative and not restrictive. That is, the present invention may be embodied in various forms without departing from the spirit or essential characteristics thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-176510, filed Jul. 4, 2007, which is hereby incorporated by reference herein in its entirety.

What is claimed is:

1. An imaging apparatus having a plurality of pixels and a control unit, each of the pixels comprising:
 a photoelectric conversion unit configured to accumulate a carrier generated by a photoelectric conversion;
 a carrier accumulation unit configured to accumulate a carrier from the photoelectric conversion unit;
 a transfer unit configured to transfer a carrier accumulated in the carrier accumulation unit;
 an amplifier configured to amplify a signal based on a carrier transferred by the transfer unit;
 an overflow drain into which a carrier from the photoelectric conversion unit is to be discharged;
 a floating diffusion region electrically connected to the amplifier, the floating diffusion region being provided in a different position from the overflow drain; and
 a reset unit configured to reset the carrier transferred by the transfer unit,
 wherein the transfer unit is configured to transfer the carrier accumulated in the carrier accumulation unit to the floating diffusion region, and
 wherein the control unit is configured to control the transfer unit and the reset unit to perform an operation including the transfer by the transfer unit and the reset by the reset unit after the transfer plural times for a single carrier accumulation period in the photoelectric conversion unit.

2. The imaging apparatus according to claim 1, wherein each of the pixels further comprises:
 a read out unit configured to read out a signal amplified by the amplifier; and
 wherein the control unit is configured to control the transfer unit, the read out unit, and the reset unit to perform an operation including the transfer, the read out by the read out unit after the transfer, and the reset by the reset unit after the read out plural times for a single carrier accumulation period in the photoelectric conversion unit.

3. The imaging apparatus according to claim 1, wherein the carrier accumulation unit has a PN junction capacitor.

4. The imaging apparatus according to claim 1, wherein the carrier from the photoelectric conversion unit is discharged to the overflow drain when the carrier accumulation unit accumulates the carrier from the photoelectric conversion unit.

5. An imaging apparatus having a plurality of pixels and a control unit, each of the pixels comprising:
 a photoelectric conversion unit configured to accumulate a carrier generated by a photoelectric conversion;
 a carrier accumulation unit configured to accumulate a carrier from the photoelectric conversion unit;
 an amplifier configured to amplify a signal based on a carrier accumulated in the carrier accumulated unit;
 a read out unit configured to read out a signal amplified by the amplifier;
 an overflow drain into which a carrier from the photoelectric conversion unit is to be discharged;
 a floating diffusion region electrically connected to the amplifier, the floating diffusion region being provided in a different position from the overflow drain; and
 a reset unit configured to reset the carrier of the carrier accumulation unit and the floating diffusion region,
 wherein the control unit is configured to control the read out unit and the reset unit to perform an operation including the read out by the read out unit and the reset by the reset unit after the read out plural times for a single carrier accumulation period in the photoelectric conversion unit.

6. An imaging system comprising:
 an imaging apparatus having a plurality of pixels;
 a control unit configured to control the imaging apparatus; and
 a signal processing unit configured to process a signal from the imaging device,
 wherein each of the pixels includes:

(a) a photoelectric conversion unit configured to accumulate a carrier generated by a photoelectric conversion;
(b) a carrier accumulation unit configured to accumulate a carrier from the photoelectric conversion unit;
(c) a transfer unit configured to transfer a carrier accumulated in the carrier accumulation unit;
(d) an amplifier configured to amplify a signal based on a carrier transferred by the transfer unit;
(e) an overflow drain into which a carrier from the photoelectric conversion unit is to be discharged;
(f) a floating diffusion region electrically connected to the amplifier, the floating diffusion region being provided in a different position from the overflow drain; and
(g) a reset unit configured to reset the carrier transferred by the transfer unit,
wherein the transfer unit is configured to transfer the carrier accumulated in the carrier accumulation unit to the floating diffusion region, and
wherein the control unit is configured to control the transfer unit and the reset unit to perform an operation including the transfer by the transfer unit and the reset by the reset unit after the transfer plural times for a single carrier accumulation period in the photoelectric conversion unit.

7. An imaging system comprising:
an imaging apparatus having a plurality of pixels;
a control unit configured to control the imaging apparatus; and
a signal processing unit configured to process a signal from the imaging device,
wherein each of the pixels comprises:
(a) a photoelectric conversion unit configured to accumulate a carrier generated by a photoelectric conversion;
(b) a carrier accumulation unit configured to accumulate a carrier from the photoelectric conversion unit;
(c) an amplifier configured to amplify a signal based on a carrier accumulated in the carrier accumulated unit;
(d) a read out unit configured to read out a signal amplified by the amplifier;
(e) an overflow drain into which a carrier from the photoelectric conversion unit is to be discharged;
(f) a floating diffusion region electrically connected to the amplifier, the floating diffusion region being provided in a different position from the overflow drain; and
(g) a reset unit configured to reset the carrier of the carrier accumulation unit and the floating diffusion region,
wherein the control unit is configured to control the read out unit and the reset unit to perform an operation including the read out by the read out unit and the reset by the reset unit after the read out plural times for a single carrier accumulation period in the photoelectric conversion unit.

8. An imaging apparatus having a plurality of pixels and a control unit, each of the pixels comprising:
a photoelectric conversion unit configured to accumulate a carrier generated by a photoelectric conversion;
a carrier accumulation unit configured to accumulate a carrier from the photoelectric conversion unit;
a transfer unit configured to transfer a carrier accumulated in the carrier accumulation unit;
an amplifier configured to amplify a signal based on a carrier transferred by the transfer unit;
an overflow drain into which a carrier from the photoelectric conversion unit is to be discharged;
a read out unit configured to read out a signal amplified by the amplifier; and
a reset unit configured to reset the carrier transferred by the transfer unit, and
wherein the control unit is configured to control the transfer unit, the read out unit, and the reset unit to perform an operation including the transfer by the transfer unit, the read out by the read out unit after the transfer, and the reset by the reset unit after the read out plural times for a single carrier accumulation period in the photoelectric conversion unit.

* * * * *